(12) United States Patent
Naitoh (10) Patent No.: US 7,325,119 B2
(45) Date of Patent: Jan. 29, 2008

(54) DATA STORAGE APPARATUS CAPABLE OF STORING DATA STORED IN EXTERNAL EQUIPMENT

(75) Inventor: Tadahiro Naitoh, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 579 days.

(21) Appl. No.: 10/736,375

(22) Filed: Dec. 15, 2003

(65) Prior Publication Data

US 2004/0126090 A1    Jul. 1, 2004

(30) Foreign Application Priority Data

Dec. 24, 2002    (JP)    ............... 2002-372095

(51) Int. Cl.
*G06F 12/00*    (2006.01)
(52) U.S. Cl. ...................... 711/170; 711/115
(58) Field of Classification Search ................ 711/170, 711/115; 386/125, 46
See application file for complete search history.

(56) References Cited

U.S. PATENT DOCUMENTS

| | | | | |
|---|---|---|---|---|
| 6,119,176 A | * | 9/2000 | Maruyama | ............ 710/25 |
| 6,145,046 A | * | 11/2000 | Jones | ............ 710/301 |
| 6,449,226 B1 | * | 9/2002 | Kumagai | ............ 369/47.1 |
| 7,068,386 B2 | * | 6/2006 | Kawanabe | ............ 358/1.15 |
| 7,155,109 B2 | * | 12/2006 | Gates et al. | ............ 386/68 |
| 2003/0061408 A1 | * | 3/2003 | Ayaki | ............ 710/5 |
| 2004/0017634 A1 | * | 1/2004 | Chin-Lung et al. | ...... 360/97.01 |

FOREIGN PATENT DOCUMENTS

| | | |
|---|---|---|
| JP | 4-238477 | 8/1992 |
| JP | 5-20850 | 1/1993 |
| JP | 6-223544 | 8/1994 |
| JP | 6-295532 | 10/1994 |
| JP | 8-241229 | 9/1996 |
| JP | 10-269129 | 10/1998 |
| JP | 2000-137634 | 5/2000 |
| JP | 2001-93226 | 4/2001 |
| JP | 2001-110171 | 4/2001 |
| JP | 2001-195807 | 7/2001 |
| JP | 2001-357008 | 12/2001 |
| JP | 2002-170323 | 6/2002 |

(Continued)

OTHER PUBLICATIONS

Patent Abstracts of Japan, Publication No. 2001-195807 dated Jul. 19, 2001, 1 pg.

(Continued)

*Primary Examiner*—Reginald Bragdon
*Assistant Examiner*—Aracelis Ruiz
(74) *Attorney, Agent, or Firm*—Osha Liang LLP (57) ABSTRACT

In a PVR, when a prescribed type of data is present in external equipment connected to the PVR via an external connection portion, the prescribed type of data is read from the external equipment, and the read data is stored in an HDD. The prescribed type of data stored in the HDD is written into the external equipment connected to the PVR via the external connection portion, based on an operation by a user. After the prescribed type of data is read from the external equipment, the PVR may erase the prescribed type of data with respect to the external equipment.

12 Claims, 6 Drawing Sheets

FOREIGN PATENT DOCUMENTS

| | | |
|---|---|---|
| JP | 2002-245716 | 8/2002 |
| JP | 2002-269905 | 9/2002 |

OTHER PUBLICATIONS

Japanese Office Action for Japanese patent application No. 2002-372095, mailed Feb. 21, 2006, 3 pages.

English translation of Japanese Office Action for Japanese patent application No. 2002-372095, mailed Feb. 21, 2006, 4 pages.

Patent Abstracts of Japan, Publication No. 2002-269905, Publication Date: Sep. 20, 2002, 1 page.

Patent Abstracts of Japan, Publication No. 10-269129, Publication Date: Oct. 9, 1998, 1 page.

Patent Abstracts of Japan, Publication No. 2001-357008, Publication Date: Dec. 26, 2001, 1 page.

Patent Abstracts of Japan, Publication No. 2002-170323, Publication Date: Jun. 14, 2002, 1 page.

Patent Abstracts of Japan, Publication No. 08-241229, Publication Date: Sep. 17, 1996, 1 page.

Patent Abstracts of Japan, Publication No. 2000-137634, Publication Date: May 16, 2000, 1 page.

Patent Abstracts of Japan, Publication No. 2001-110171, Publication Date: Apr. 20, 2001, 1 page.

Patent Abstracts of Japan, Publication No. 2002-245716, Publication Date: Aug. 30, 2002, 1 page.

Patent Abstracts of Japan, Publication No. 06-295532, Publication Date: Oct. 21, 1994, 1 page.

Patent Abstracts of Japan, Publication No. 2001-093226, Publication Date: Apr. 6, 2001, 1 page.

Patent Abstracts of Japan, Publication No. 06-223544, Publication Date: Aug. 12, 1994, 1 page.

Patent Abstracts of Japan, Publication No. 05-020850, Publication Date: Jan. 29, 1993, 1 page.

Japanese Office Action for Japanese Patent Application No. 2002-372095, Mailed May 30, 2006, and English translation thereof, 5 pages.

Patent Abstracts of Japan, Publication No. 04-238477, Publication Date: Aug. 26, 1992, 1 page.

\* cited by examiner

DATA STORAGE APPARATUS CAPABLE OF STORING DATA STORED IN EXTERNAL EQUIPMENT

BACKGROUND OF THE INVENTION

1. Field of the Invention

The present invention relates to a data storage apparatus, and more particularly to a data storage apparatus improving usability of peripheral equipment.

2. Description of the Background Art

A variety of technologies for a data storage apparatus in terms of handling of contents stored therein have conventionally been disclosed in order to improve usability.

For example, Japanese Patent Laying-Open No. 2001-195807 discloses a technology for inquiring whether or not video data of a program that was reproduced may be erased when reproduction of the video data of the program recorded in a recording medium is stopped, in order to avoid wasted space in the recording medium occupied by the video data of the already-viewed program in a recording apparatus, which is one example of a data storage apparatus.

On the other hand, it has been difficult to provide a scheme to improve usability in terms of handling the storage contents in compact equipment or in equipment containing a memory and focusing on portability, as represented by a digital camera or an MP3 (Moving Picture Experts Group Audio Layer-3) player. As a portable battery is employed in such equipment, original functions can solely be achieved. In other words, a special operation with respect to the storage contents has been difficult. Moreover, it has been difficult to provide a sufficient number of operation buttons or a sufficiently large display device for handling the storage contents in order to improve usability.

SUMMARY OF THE INVENTION

The present invention was made in view of the aforementioned problems. An object of the present invention is to provide a data storage apparatus capable of improving usability of the above-described equipment, when such equipment that improvement in usability has conventionally been difficult is connected as peripheral equipment.

A data storage apparatus according to one aspect of the present invention is characterized by including a storage portion storing data; a connection portion for establishing connection with external equipment; a control portion causing a prescribed type of data stored in the external equipment to be stored in the storage portion, when the connection portion is connected to the external equipment and when the prescribed type of data is stored in the external equipment; and an input portion for receiving an input of information for modifying the prescribed type. The control portion determines whether or not the external equipment is connected to the connection portion when an operation for causing the prescribed type of data stored in the storage portion to be stored in the external equipment connected to the connection portion is performed. If the control portion determines that the external equipment is connected, the control portion determines whether or not the external equipment has a storage capacity for storing the prescribed type of data stored in the storage portion. If the control portion determines that the external equipment has the storage capacity, the control portion causes the prescribed type of data stored in the storage portion to be stored in the external equipment.

A data storage apparatus according to another aspect of the present invention is characterized by including a storage portion storing data; a connection portion for establishing connection with external equipment; and a control portion causing a prescribed type of data stored in the external equipment to be stored in the storage portion, when the connection portion is connected to the external equipment and when the prescribed type of data is stored in the external equipment.

According to the present invention, when the external equipment is connected to the data storage apparatus, presence/absence of the prescribed type of data in the external equipment is checked. If the prescribed type of data is present, it is stored in the data storage apparatus. Accordingly, even when handling such as processing of the prescribed type of data is inconvenient in the external equipment, another apparatus, namely a data storage apparatus can perform such handling instead. Therefore, usability of the connected external equipment can be improved by the data storage apparatus according to the present invention.

In addition, according to the present invention, the type of data to be stored in the data storage apparatus can arbitrarily be modified. Therefore, the processing in the data storage apparatus can be modified as desired by a user.

Moreover, according to the present invention, it is possible to cause the external equipment connected to the data storage apparatus to store the data, which is converse to the aforementioned example. In other words, storage contents in the external equipment can totally be organized by means of the data storage apparatus.

Furthermore, according to the present invention, storage of data in the external equipment is performed only if a capacity available for storing the data in that external equipment is ensured. Therefore, unnecessary processing in the data storage apparatus can be avoided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, a personal video recorder (hereinafter, abbreviated as "PVR") which is one embodiment of the data storage apparatus according to the present invention will be described with reference to the figures. It is noted that the same reference characters refer to the same or corresponding components in the description below unless otherwise specified, and their designations and functions are also the same. Therefore, detailed description thereof will not be repeated.

Figure 1:
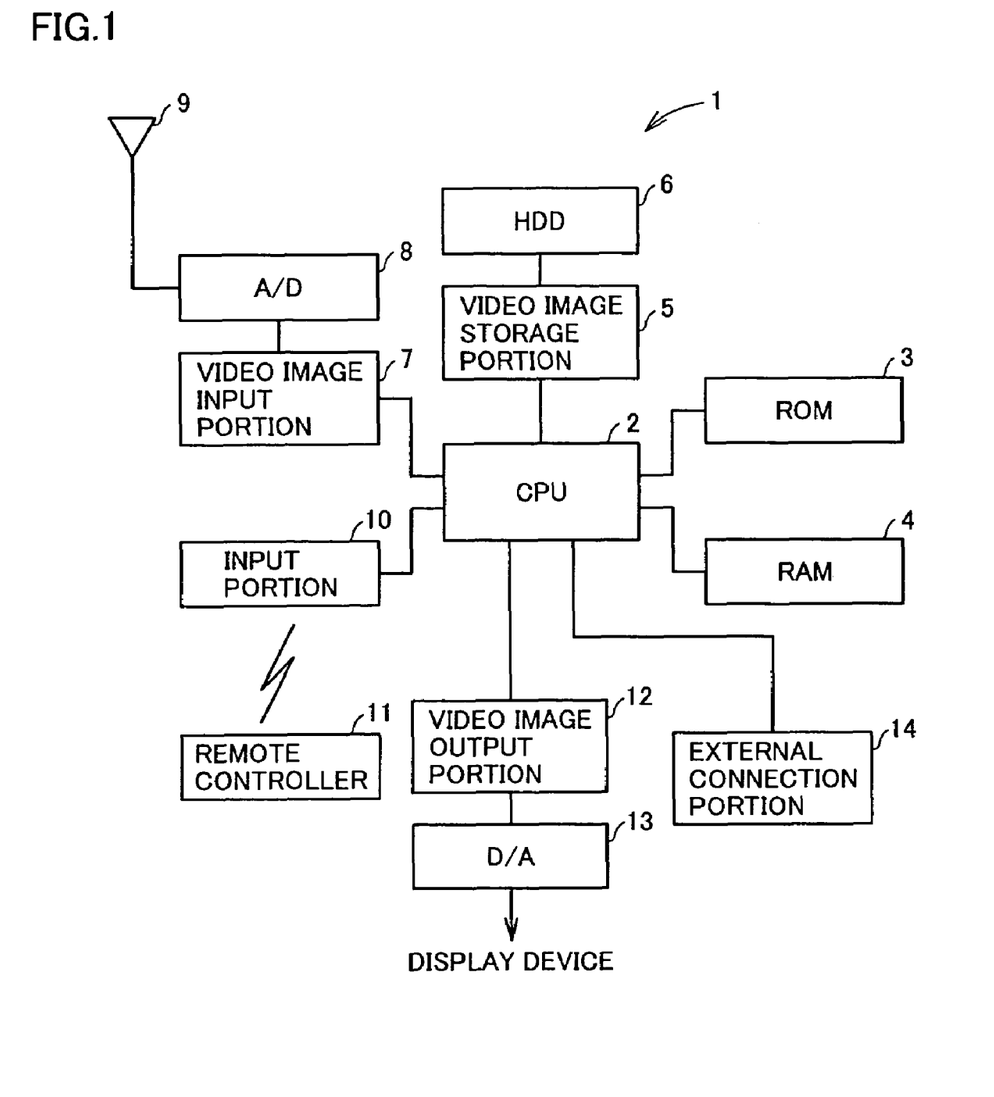
FIG. 1 is a control block diagram of a personal video recorder, which is one embodiment of a data storage apparatus according to the present invention.

Referring to FIG. 1, a PVR 1 includes a CPU 2 performing overall control of an operation of PVR 1.

PVR 1 further includes an ROM (Read Only Memory) 3, an RAM (Random Access Memory) 4, a video image storage portion 5, an HDD (Hard Disk Drive) 6, a video image input portion 7, an A/D converter (Analog Digital Converter) 8, an antenna 9, an input portion 10, a remote controller 11, a video image output portion 12, a D/A converter (Digital Analog Converter) 13, and an external connection portion 14.

ROM 3 stores not only a program or the like to be executed by CPU 2 as in general information processing equipment, but also information on a type of data automatically stored by PVR 1 among data stored in external equipment connected to PVR 1. Examples of the type of data include image data such as GIF (Graphic Interchange Format) and JPEG (Joint Photographic Experts Group), audio data such as MP3, and multimedia data such as motion picture.

RAM 4 attains a function as a work area of CPU 2. Video image storage portion 5 is provided for causing HDD 6 to store information. Video image input portion 7 is provided for input to CPU 2 of a variety of data such as a video image obtained by conversion to digital data by A/D converter 8 after reception by antenna 9.

Input portion 10 is provided for input of information to PVR 1 by a user, and includes a single or a plurality of key operation portion(s), for example. Remote controller 11 serves to transmit information to be input to PVR 1 from a place remote from PVR 1, and it transmits the information toward a reception portion (not shown) provided in input portion 10. In input portion 10, the information received from remote controller 11 is processed in the same manner as the information input from the key operation portion described above.

Video image output portion 12 is provided for output of video image (and audio) data to an external display device via D/A converter 13, under control of CPU 2. Though PVR 1 without a display device has been described in the present embodiment, PVR 1 may be configured integrally with the display device. In other words, PVR 1 may be configured to include the display device.

External connection portion 14 serves as an interface portion when PVR 1 is connected to external equipment, and is implemented by a USB (Universal Serial Bus) terminal, for example.

Figure 2:
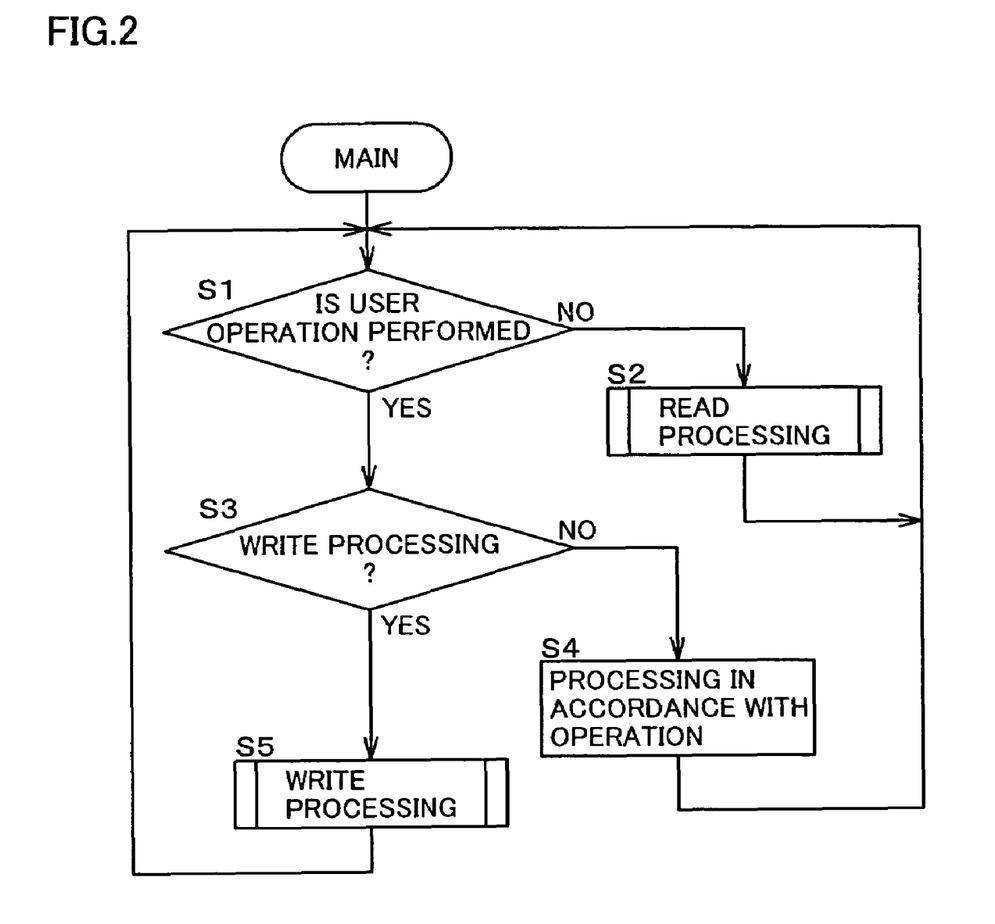
FIG. 2 is a flowchart of a main routine in a CPU (Central Processing Unit).

Referring to FIG. 2, at step S1 (hereinafter, the term "step" will not be repeated), CPU 2 determines whether or not an operation with respect to PVR 1 by a user has been performed. Here, the operation with respect to PVR 1 refers to input of information using input portion 10 or remote controller 11. If CPU 2 determines that the operation has been performed, the processing proceeds to S3. On the other hand, if CPU 2 determines that the operation has not been performed, the processing proceeds to S2.

At S2, CPU 2 performs read processing to read data from the external equipment connected to PVR 1 via external connection portion 14, and thereafter, the processing returns to S1. The read processing will be described in detail later.

At S3, CPU 2 determines whether or not the operation by the user is to instruct execution of write processing. If CPU 2 determines that the operation is to instruct execution of the write processing, the processing proceeds to S5. If the operation instructs another processing, the processing proceeds to S4. At S4, CPU 2 performs a processing in accordance with the operation by the user, and thereafter, the processing returns to S1.

At S5, CPU 2 performs the write processing to write data into the external equipment connected to PVR 1 via external connection portion 14, and thereafter, the processing returns to S1. The write processing will be described in detail later.

Figure 3:
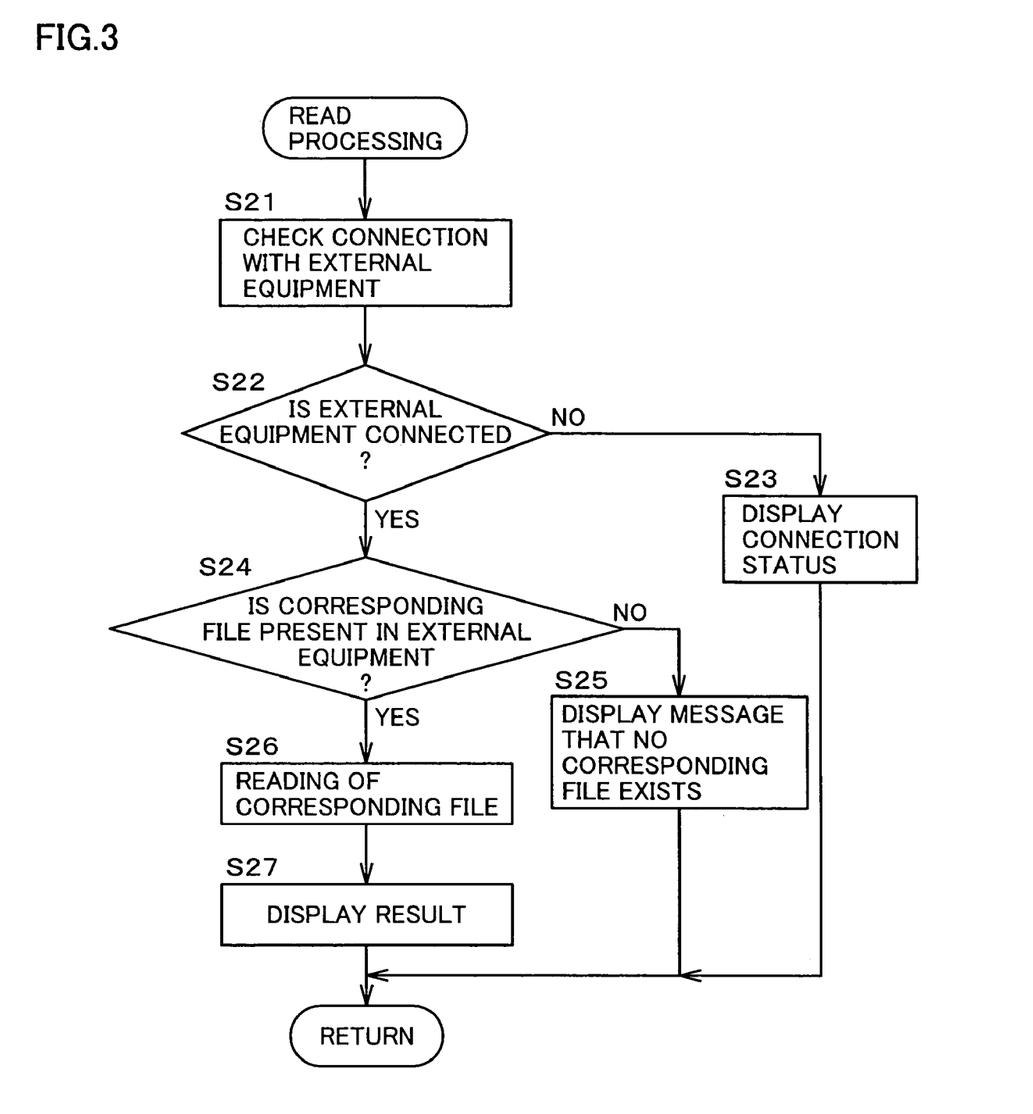
FIG. 3 is a flowchart of a sub-routine in read processing in FIG. 2.

Referring to FIG. 3, in the read processing, CPU 2 initially checks connection to external equipment at S21. Checking of connection to the external equipment refers to checking as to whether or not the external equipment is connected to external connection portion 14.

At S22, CPU 2 refers to a result of checking at S21. The processing proceeds to S24 if external equipment is connected, and the processing proceeds to S23 if no external equipment is connected, respectively.

At S23, CPU 2 causes a display device to show information indicating that no external equipment is connected, and the processing returns to a main routine.

At S24, CPU 2 determines whether or not a corresponding file is stored in the connected external equipment. If CPU 2 determines that the corresponding file is stored, the processing proceeds to S26. If CPU 2 determines that the corresponding file is not stored, the processing proceeds to S25. Here, the term "corresponding file" refers to a file of a type of data stored in ROM 3 as described above.

At S25, CPU 2 causes the display device to show information indicating that the corresponding file is not present, and the processing returns to the main routine.

At S26, CPU 2 reads the corresponding file stored in the external equipment via external connection portion 14, and writes that file in HDD 6 using video image storage portion 5. When reading and writing is finished, at S27, CPU 2 causes the display device to show information indicating a result of reading and writing, and the processing returns to the main routine.

Figure 4:
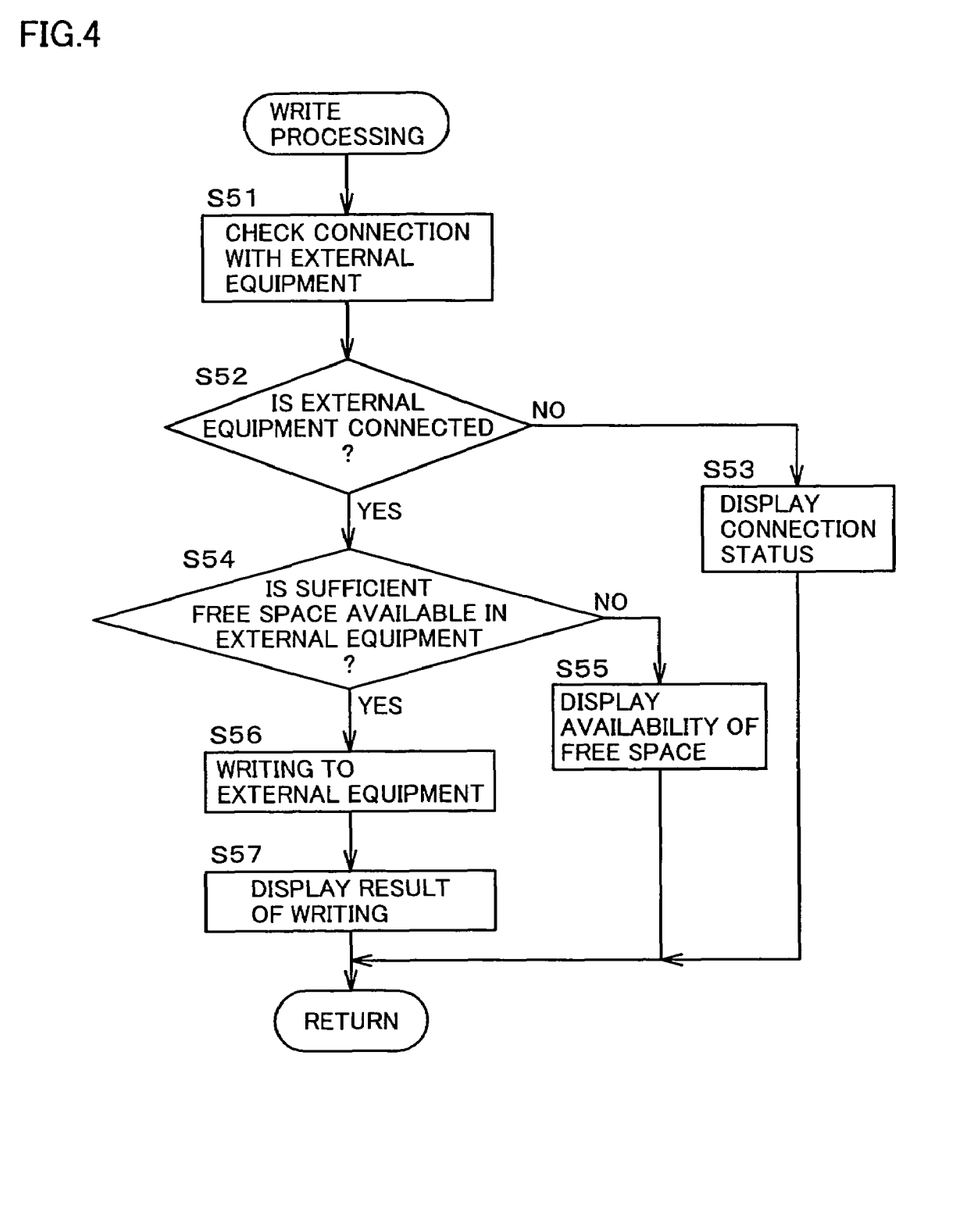
FIG. 4 is a flowchart of a sub-routine in write processing in FIG. 2.
Figure 5:
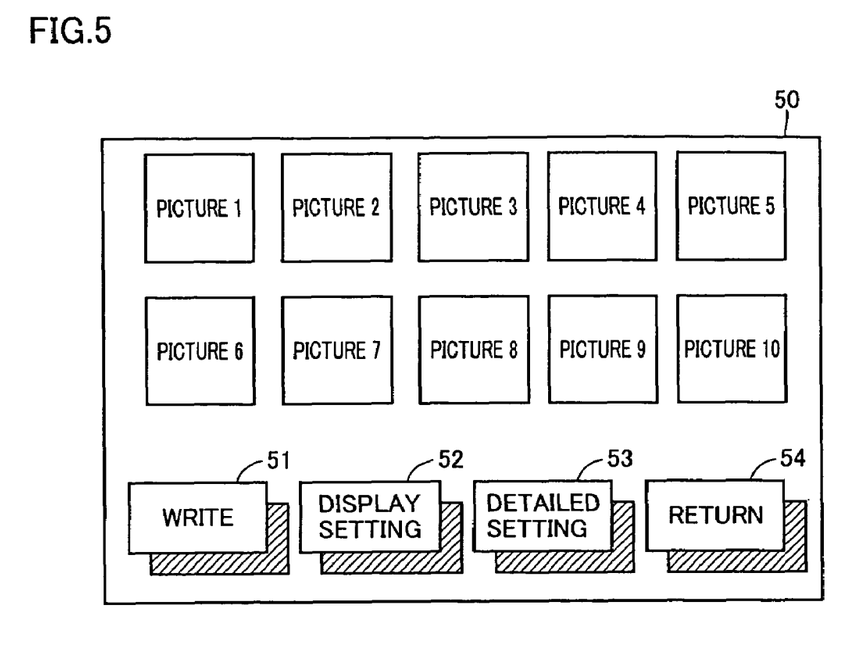
FIGS. 5 to 8 show examples of screens on a display device through the processing in the personal video recorder in FIG. 1.

Referring now to FIG. 4, the write processing at S5 in FIG. 2 will be described in detail. When the user operates input portion 10 or remote controller 11 for executing the write processing, CPU 2 causes the display device to show a screen listing "corresponding files" that are to be determined at S24, as shown in FIG. 5. Screen 50 in FIG. 5 displays 10 kinds of image data from picture 1 to picture 10. In screen 50, buttons 51 to 54 are also displayed.

When the user operates button 51, execution of the write processing is confirmed and the write processing shown in FIG. 4 is started. When the user operates button 52, PVR 1 enters a state where setting of display layout in screen 50 is allowed. When the user operates button 53, PVR 1 enters a state where setting of conditions for the write processing is allowed. When the user operates button 54, PVR 1 enters a state where execution of the write processing is canceled.

Referring to FIG. 4, in the write processing, CPU 2 initially checks connection to external equipment at S51, as in S21.

Then, at S52, CPU 2 refers to a result of checking at S51. The processing proceeds to S54 if external equipment is connected, and the processing proceeds to S53 if no external equipment is connected, respectively.

Figure 6:
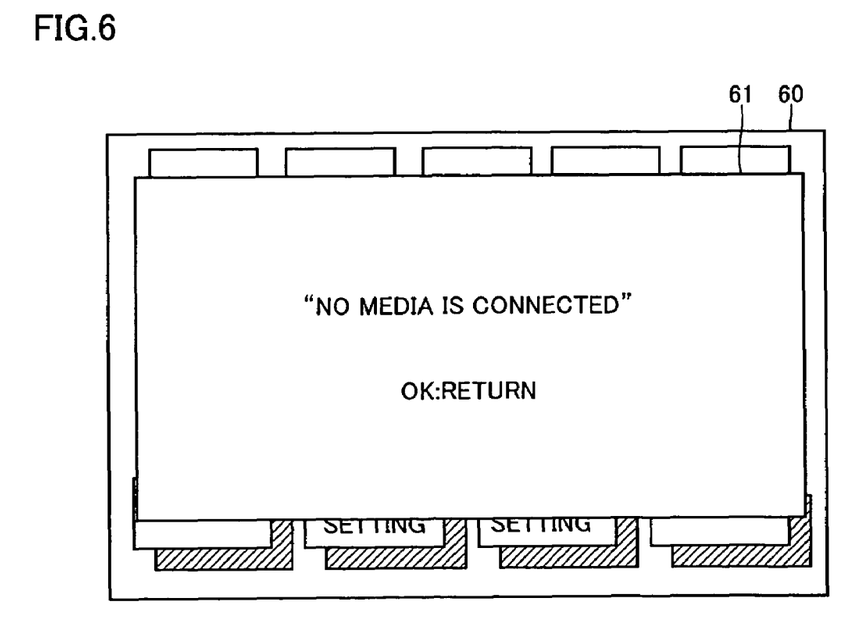

At S53, CPU 2 causes the display device to show information indicating that the external equipment is not connected, as in a screen 60 in FIG. 6, and the processing returns to the main routine. Screen 60 in FIG. 6 has a field 61 containing a message that the external equipment is not connected.

At S54, CPU 2 determines whether or not a free space sufficient for storing "corresponding files" as shown in screen 50 is available in a storage device in the connected external equipment. If CPU 2 determines that the sufficient free space is available, the processing proceeds to S56. If CPU 2 determines that the sufficient free space is not available, the processing proceeds to S55.

Figure 7:
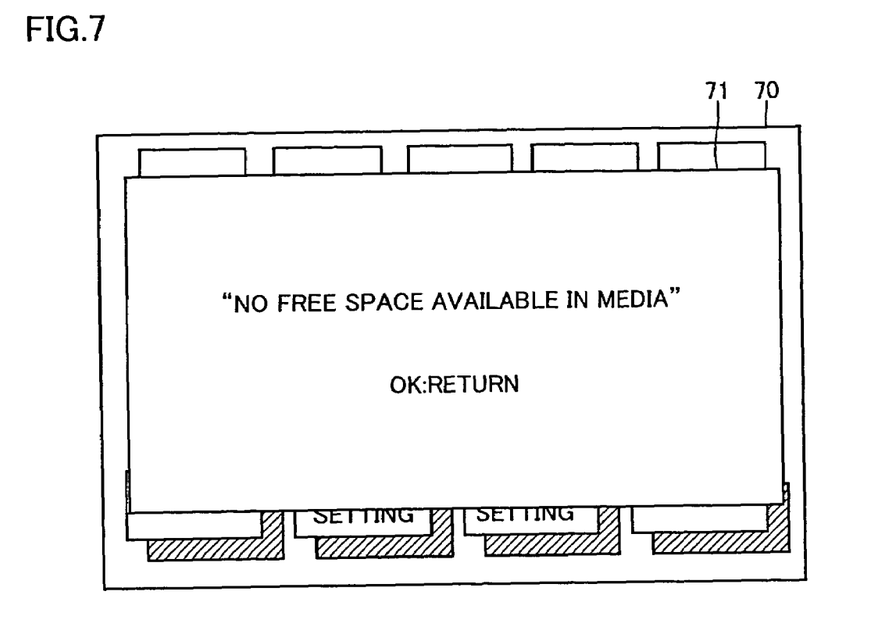

At S55, CPU 2 causes the display device to indicate that a sufficient free space is not available in the external equipment, as shown in a screen 70 in FIG. 7, and the processing returns to the main routine. Screen 70 in FIG. 7 has a field 71 containing a message that the sufficient free space is not available in the external equipment.

Figure 8:
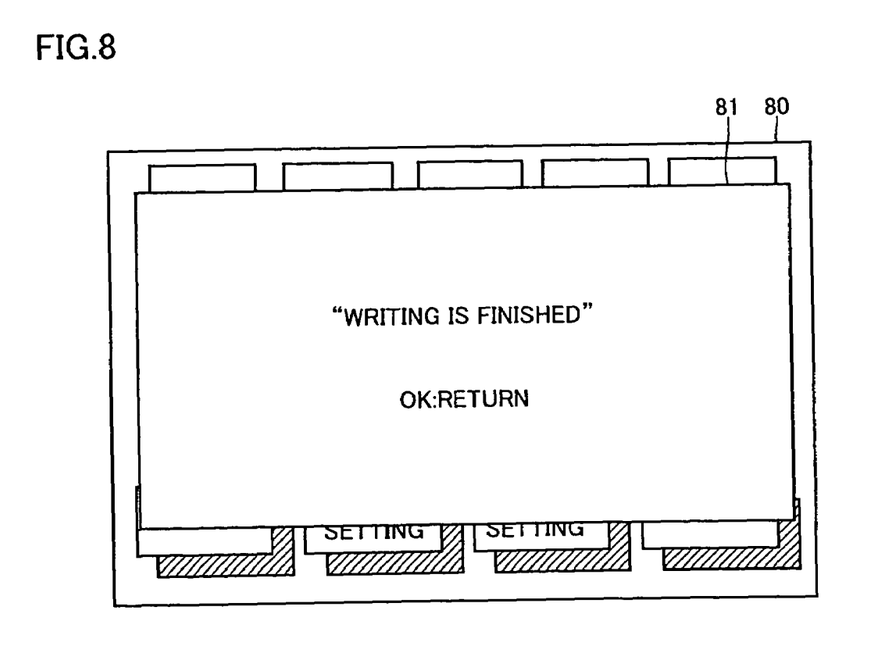

At S56, CPU 2 writes "corresponding files" as shown on screen 50 into the connected external equipment via external connection portion 14. When writing is finished, CPU 2 causes the display device to show a result of writing, as in a screen 80 in FIG. 8 at S57, and the processing returns to the main routine. Screen 80 in FIG. 8 has a field 81 containing a message that writing has been finished. If writing has failed, field 81 in screen 80 shown at S57 contains a message that writing has failed.

In the present embodiment described above, the type of data of "corresponding files" to be determined at S24 (see FIG. 3) has been stored in ROM 3 since shipment of PVR 1. The present invention, however, is not limited to such a case. PVR 1 may be configured in such a manner that information for modifying the type of the data is recorded in a non-volatile recording medium such as HDD 6 by an operation of input portion 10 and/or remote controller 11, so as to enable determination at S24 based on the information after modification.

In the present embodiment described above, determination of the type of data performed at S24 may be made by determining an extension of data stored in the external equipment, or by determining a leading portion of the data, or by determining the type of the connected external equipment itself.

Moreover, PVR 1 may attain a function to sequentially display data read from the external equipment or information corresponding to that data (e.g. data file name, if the data is audio data), like a slide show.

Furthermore, after reading data from the external equipment at S26, PVR 1 may perform an operation with respect to the external equipment so as to erase the data. Such an operation for erasing may be performed only when the user gives an instruction to do so.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data storage apparatus, comprising:
   a storage portion storing data;
   a connection portion for establishing connection with external equipment;
   a control portion configured to perform read processing, in the absence of a user write operation, wherein a prescribed type of data stored in the external equipment is read from the external equipment and stored in said storage portion when said connection portion is connected to the external equipment, wherein a presence of the prescribed type of data in the external equipment is determined by one selected from a group consisting of obtaining an extension of data stored in the external equipment and obtaining a type of the connected external equipment; and
   an input portion for receiving a user instruction for write processing of said prescribed type of data;
   wherein, in response to said instruction for write processing, said control portion determines whether external equipment is connected to said connection portion for causing said prescribed type of data stored in said storage portion to be stored in the external equipment connected to said connection portion,
   wherein when said control portion determines that the external equipment is connected, said control portion determines whether the external equipment has a storage capacity for storing said prescribed type of data stored in said storage portion of the data storage apparatus, and
   wherein when said control portion determines that the external equipment has the storage capacity, said control portion executes said instruction for write processing by storing said prescribed type of data in the external equipment.

2. A data storage apparatus, comprising:
   a storage portion storing data;
   a connection portion for establishing connection with external equipment; and
   a control portion configured to perform read processing, in the absence of a user write operation, wherein a prescribed type of data stored in the external equipment is read from the external equipment and stored in said storage portion when said connection portion is connected to the external equipment, wherein a presence of the prescribed type of data in the external equipment is determined by one selected from a group consisting of obtaining an extension of data stored in the external equipment and obtaining a type of the connected external equipment.

3. The data storage apparatus according to claim 2, further comprising an input portion for receiving an input of information for modifying said prescribed type.

4. The data storage apparatus according to claim 3, wherein said control portion causes said prescribed type of data stored in said storage portion to be stored in the external equipment connected to said connection portion.

5. The data storage apparatus according to claim 4, wherein
   said control portion determines whether the external equipment is connected to said connection portion when an operation for causing said prescribed type of data stored in said storage portion to be stored in the external equipment connected to said connection portion is performed,
   when said control portion determines that the external equipment is connected, said control portion determines whether the external equipment has a storage capacity for storing said prescribed type of data stored in said storage portion, and
   when said control portion determines that the external equipment has the storage capacity, said control portion causes said prescribed type of data stored in said storage portion to be stored in the external equipment.

6. The data storage apparatus according to claim 2, wherein said control portion causes said prescribed type of data stored in said storage portion to be stored in the external equipment connected to said connection portion.

7. The data storage apparatus according to claim 6, wherein
   said control portion determines whether the external equipment is connected to said connection portion when an operation for causing said prescribed type of data stored in said storage portion to be stored in the external equipment connected to said connection portion is performed,
   when said control portion determines that the external equipment is connected, said control portion determines whether the external equipment has a storage capacity for storing said prescribed type of data stored in said storage portion, and when said control portion determines that the external equipment has the storage capacity, said control portion causes said prescribed type of data stored in said storage portion to be stored in the external equipment.

8. The data storage apparatus according to claim 1, wherein the data storage apparatus is part of a personal video recorder.

9. A method for operating a data storage apparatus, comprising:

determining whether external equipment is connected; and when a user operation instructing a write processing is not received:

determining whether a first designated file is present in the external equipment when the external equipment is connected, wherein the presence of the first designated file in the external equipment is determined by one selected from a group consisting of obtaining an extension of the first designated file stored in the external equipment and obtaining a type of the connected external equipment; and reading the first designated file from the external equipment and storing the first designated file locally when the first designated file is present;

when a user write processing operation is received:

determining whether sufficient storage space is present in the external equipment to store a second designated file when the external equipment is connected; and writing the second designated file to the external equipment when sufficient storage space is present; and when an operation other than the write processing operation is performed by the user, processing the operation.

10. The method of claim 9, further comprising displaying a message when the external equipment is not connected.

11. The method of claim 9, further comprising displaying a message when the first designated file is not present.

12. The method of claim 9, further comprising displaying a message when sufficient storage space is not present.

* * * * *